United States Patent
Zhu et al.

(10) Patent No.: US 9,720,746 B2
(45) Date of Patent: Aug. 1, 2017

(54) ANALYTICS FOR APPLICATION PROGRAMMING INTERFACES

(71) Applicant: Accenture Global Services Limited, Dublin (IE)

(72) Inventors: Qian Zhu, Mountain View, CA (US); Teresa Tung, San Jose, CA (US); Benjamin Grimmer, Chicago, IL (US)

(73) Assignee: Accenture Global Service Limited, Dublin (IE)

(*) Notice: Subject to any disclaimer, the term of this patent is extended or adjusted under 35 U.S.C. 154(b) by 0 days.

(21) Appl. No.: 14/822,189

(22) Filed: Aug. 10, 2015

(65) Prior Publication Data

US 2015/0347201 A1   Dec. 3, 2015

Related U.S. Application Data

(63) Continuation of application No. 14/074,342, filed on Nov. 7, 2013, now Pat. No. 9,146,787.

(51) Int. Cl.
| | |
|---|---|
| *G06F 9/54* | (2006.01) |
| *H04L 29/08* | (2006.01) |
| *H04L 29/06* | (2006.01) |
| *G06N 7/00* | (2006.01) |
| *G06N 5/04* | (2006.01) |
| *G06F 9/44* | (2006.01) |
| *G06F 11/30* | (2006.01) |

(52) U.S. Cl.
CPC ............ *G06F 9/541* (2013.01); *G06F 8/74* (2013.01); *G06F 8/75* (2013.01); *G06F 11/302* (2013.01); *G06F 11/3072* (2013.01); *G06N 5/045* (2013.01); *G06N 7/005* (2013.01); *H04L 67/32* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,987,513 A | 11/1999 | Prithviraj et al. | |
| 8,515,731 B1* | 8/2013 | Ramirez Robredo | ............ G06F 17/2795 704/2 |
| 8,555,385 B1 | 10/2013 | Bhatkar et al. | |

(Continued)

FOREIGN PATENT DOCUMENTS

WO   WO 2013/089695 A1   6/2013

OTHER PUBLICATIONS

Knuth, Donald; Morris, James H., Jr.; and Pratt, Vaughan—"Knuth-Morris-Pratt algorithm," dated Oct. 17, 2013, pp. 1-8, Wikipedia, available at www.wikipedia.org.

(Continued)

*Primary Examiner* — Tuan Dao
(74) *Attorney, Agent, or Firm* — Brinks Gilson & Lione

(57) ABSTRACT

API analytics systems and methods are provided. Frequently occurring API usage patterns may be determined from API call data collected from across an API ecosystem. Alternatively or in addition, a classification structure, such as a decision tree, may be generated from the API usage patterns. A type of activity that resulted in a set of API calls being invoked may be determined from the classification structure. A similarity or difference between the set of API calls and the frequently occurring API usage patterns may also be determined and/or identified.

20 Claims, 7 Drawing Sheets

(56) References Cited

U.S. PATENT DOCUMENTS

| | | | |
|---|---|---|---|
| 2005/0091660 | A1 | 4/2005 | Cwalina et al. |
| 2005/0166115 | A1* | 7/2005 | Daume .............. G06F 11/3414 714/741 |
| 2008/0066179 | A1* | 3/2008 | Liu ...................... G06F 21/562 726/24 |
| 2012/0222120 | A1 | 8/2012 | Rim et al. |
| 2014/0164444 | A1 | 6/2014 | Bowen et al. |
| 2014/0208296 | A1* | 7/2014 | Dang ...................... G06F 8/75 717/123 |
| 2014/0237595 | A1* | 8/2014 | Sridhara ............. H04L 63/1408 726/23 |
| 2014/0344232 | A1 | 11/2014 | Kludy |
| 2015/0121401 | A1* | 4/2015 | Laredo ...................... G06F 9/54 719/328 |
| 2015/0128156 | A1 | 5/2015 | Zhu et al. |

OTHER PUBLICATIONS

Kuramochi, Michihiro; and Karypis, George—"An Efficient Algorithm for Discovering Frequent Subgraphs," dated Jun. 27, 2002, pp. 1-27, Department of Computer Science/Army HPC Research Center, University of Minnesota, Technical Report 02-026, Minneapolis, MN.

Patent Examination Report No. 1, dated Nov. 27, 2014, pp. 1-4, Australian Patent Application No. 2014259533, IP Australia, Woden, ACT, Australia.

Andrzej Wasylkowski et al., "Detecting Object Usage Anomalies," dated 2007, pp. 35-44, Proceedings of the $6^{th}$ joint meeting of the European Software Engineering Conference and the ACM SIGSOFT Symposium on the foundations of software engineering, New York, New York.

Pradel M et al., "Automatic Generation of Object Usage Specifications from Large Method Traces," dated Nov. 16, 2009, pp. 371-382, Automated Software Engineering, $24^{th}$ IEEE/ACM International Conference, Piscataway, New Jersey.

Mark Gabel et al., "Javert: Fully Automatic Mining of General Temporal Properties from Dynamic Traces," dated Jan. 1, 2008, pp. 339-349, Proceedings of the $16^{th}$ ACM SIGSOFT International Symposium on the foundations of software engineering, New York, New York.

Hao Zhong et al., "MAPO: Mining and Recommending API Usage Patterns," dated Jul. 6, 2009, pp. 318-343, ECOOP 2009—Object-Oriented Programming, Springer Berlin Heidelberg.

Extended European Search Report, dated Apr. 8, 2015, pp. 1-8, European Patent Application No. 14192240.1, European Patent Office, Munich, Germany.

Somayaji, Anil Buntwal "Operating System Stability and Security thorugh Process Homeostasis", dated Jul. 2002, pp. 1-198, The University of New Mexico, Albuquerque, New Mexico.

* cited by examiner

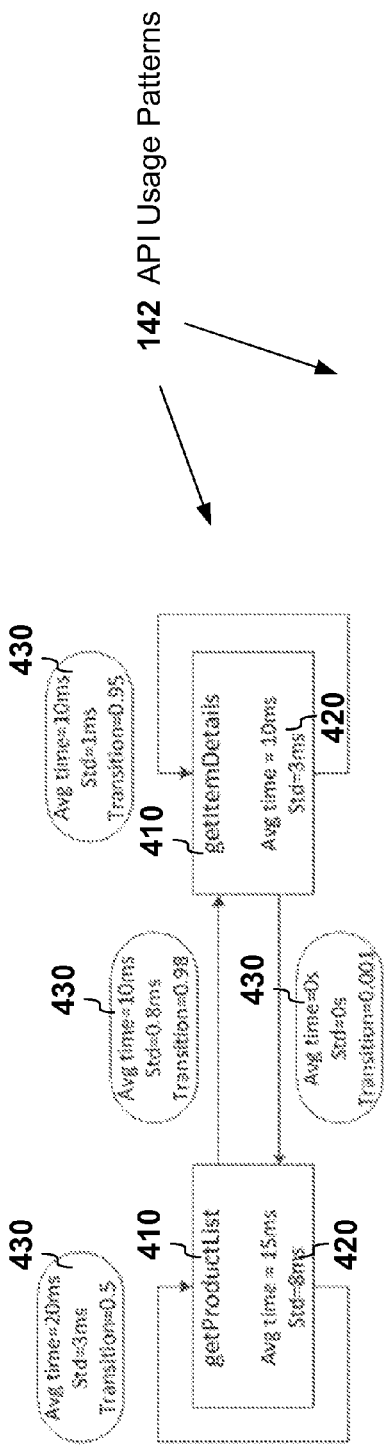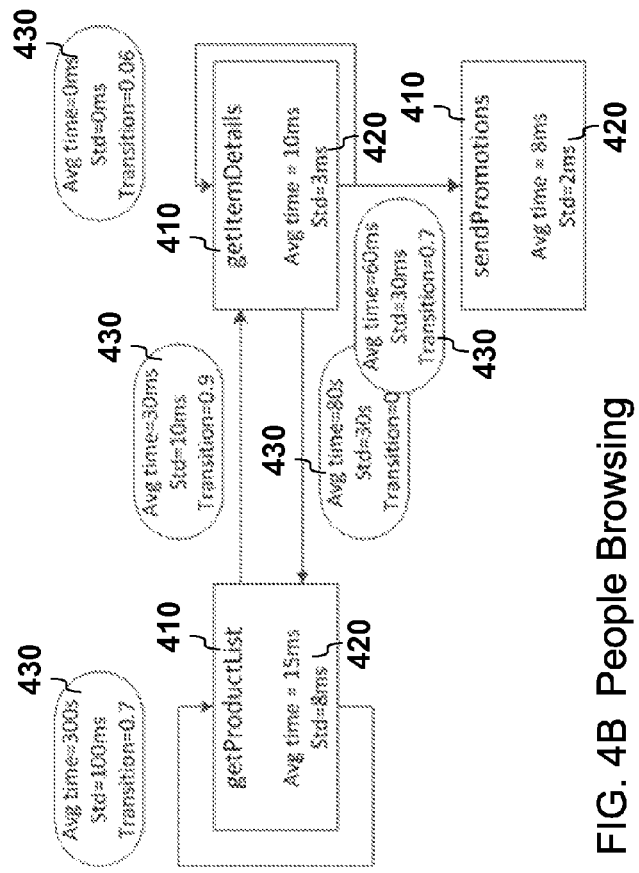
FIG. 4A Machine Scripting
FIG. 4B People Browsing

ANALYTICS FOR APPLICATION PROGRAMMING INTERFACES

CROSS-REFERENCE TO RELATED APPLICATIONS

This application is a continuation of, and claims priority under 35 USC §120 to, U.S. application Ser. No. 14/074,342, "ANALYTICS FOR APPLICATION PROGRAMMING INTERFACES" filed Nov. 7, 2013, the entire contents of which are incorporated by reference, and which issued as U.S. Pat. No. 9,146,787 on Sep. 29, 2015.

BACKGROUND

1. Technical Field

This application relates to Application Programming Interfaces and, in particular, to analytics for Application Programming Interfaces.

2. Related Art

Cloud-based services, web services, and other types of services publish Application Programming Interfaces (APIs) through which software may access the services. For some services, such as SOAP (Simple Object Access Protocol) and REST (Representational State Transfer) based services, an API may be in the form of a specification of calls exposed to consumers or users of the API. For example, a web API may be a programmatic interface to a request-response message system in which the requests may be expressed in a text format, such as JSON (JavaScript Object Notation) or XML (eXtensible Markup Language), and which the programmatic interface is exposed via a network such as the Internet. Alternatively, an API may be in the form of a library that includes specifications for routines, data structures, object classes, and/or variables.

SUMMARY

A method may be provided that determines an activity type of an activity that resulted in an API (Application Programming Interface) workflow pattern. A first API call data may be retrieved that identifies sets of API calls detected during performance of use cases. Each one of the sets of API calls resulted from a performance of a respective one of the use cases. A truncated API call data may be generated from the first API call data by consolidating duplicated API calls in each of the sets of API calls. An API usage pattern may be detected in the truncated API call data. The API usage pattern may identify a series of truncated API calls that is repeated within and/or across at least one of the sets of API calls. A second API call data may be retrieved that identifies a set of API calls that are invoked during an unknown activity. Based on the second API call data and the API usage pattern, a type of activity that resulted in the set of API calls identified in the second API call data may be determined.

An application programming interface (API) analytics system may be provided. The system may include a memory and a usage identification module. The memory may include API call data that identifies a set of API calls invoked in response to an unknown activity, and predetermined API usage patterns that each identifies a series of API calls performed as a result of a corresponding use case. The usage identification module may form truncated API call data in which duplicated API calls in the set of API calls are consolidated in the truncated set of API calls. The usage identification module may determine a type of the unknown activity based on the truncated API call data and on a classification structure determined from the predetermined API usage patterns.

A computer readable storage medium may also be provided for application programming interface (API) analytics. The computer readable storage medium may comprise computer executable instructions executable by a processor. The instructions may be executable to retrieve API call data that identifies sets of API calls invoked as a result of performance of a use case. API requests that invoked API calls in each one of the sets of API calls may share a corresponding common context. The instructions may be executable to generate a first truncated API call data from the API call data, where duplicated API calls in each of the sets of API calls are consolidated in the first truncated API call data. The instructions may be executable to identify API usage patterns in the first truncated API call data that occur above a threshold frequency. The instructions may be executable to identify a similarity between the identified API usage patterns and a second truncated API call data that identifies API calls invoked during an unknown activity.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 4A illustrates an example of an API usage pattern that results from execution of a script that crawls an API set searching for products and details about the products;

FIG. 4B illustrates an example of an API usage pattern that results from a person browsing a catalog through a website application;

DETAILED DESCRIPTION

By way of introduction, an application programming interface (API) analytics system may be provided. The system may include a memory and a usage identification module. The memory may include API call data that identifies a set of API calls invoked in response to an unknown activity, and predetermined API usage patterns. For example, each API call in the set of API calls may be a respective programmatic procedure included in an API. Each predetermined API usage pattern may identify a series of API calls performed or invoked as a result of a corresponding use case. The use case may be, for example, browsing a products catalog API or any other type of activity.

The usage identification module may form truncated API call data in which duplicated API calls in the set of API calls are consolidated in the truncated set of API calls. The usage identification module may determine a type of the unknown activity based on the truncated API call data and the predetermined API usage patterns.

In a first example, the system may include a pattern classification module that generates a classification structure, such as a decision tree, from the predetermined API usage patterns. The usage identification module may determine the type of the unknown activity through an application of the truncated API call data to the classification structure. In a second example, the usage identification module may determine that one of the predetermined API usage patterns matches the truncated API call data. The usage identification module may identify any difference and/or similarity between one or more of the predetermined API usage patterns. In some examples, the usage identification module may determine the type of the unknown activity to be a type of activity characterized by the corresponding use case of the predetermined API usage pattern that matches the truncated API call data.

One technical advantage of the systems and methods described below is that API monitoring and pattern detection in API usage may occur in real-time. Another technical advantage of the systems and methods described below is that API calls are analyzed across transactions or sessions. Yet another technical advantage of the system and methods described below is scalability despite the presence of a significant amount of API traffic. Still another technical advantage may be an ability to classify activity types based on a similarity to predetermined API usage patterns as opposed to exact matches to predetermined API usage patterns.

Figure 1:
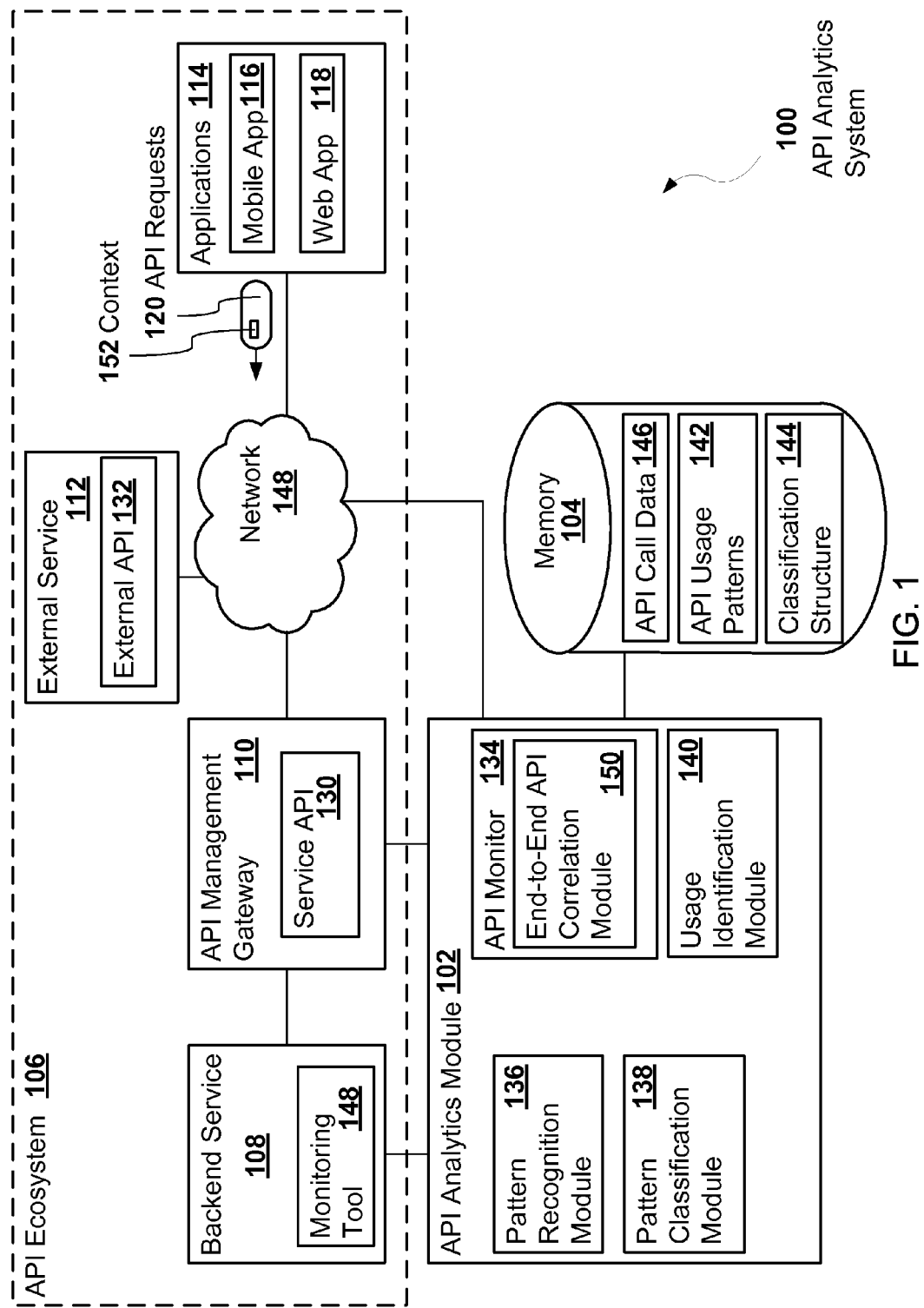
FIG. 1 illustrates an example of an API analytics system.

FIG. 1 illustrates an example of an API analytics system 100. The system 100 may include an API analytics module 102, a memory 104 for storage, and an API ecosystem 106.

The API ecosystem 106 may be any system comprising one or more components that implement, expose, manage, and/or consume one or more APIs. For example, the API ecosystem 106 may comprise a backend service 108, an API management gateway 110, an external service 112, and one or more applications 114, such as a mobile app 114 or a web application 116.

Each of the applications 114 may be any component that consumes or calls one or more APIs. The mobile app 116 may be an application that executes on a mobile device, such as a smart phone, a cell phone, a tablet computer, a personal digital assistant, or a customized device. The web application 118 may be any application that executes in a web browser or in a web application server.

The API management gateway 110 may be any component that exposes an API, such as a service API 130. For example, the API management gateway 110 may be a component that receives API requests 120 from the applications 114 and directs the API requests 120 to an endpoint, such as the backend service 108. The API gateway 110 may manage API traffic by load balancing, rate limiting, authentication, or performing any other management activity. Examples of the API management gateway 110 may include a gateway from APIGEE® (a registered trademark of Apigee Corporation of Palo Alto, Calif.), a gateway from LAYER 7® (a registered trademark of CA, Inc. of Islandia, N.Y.), a gateway from WSO2® (a registered trademark of WSO2, Inc. of Palo Alto, Calif.), a web server, an application server, a proxy server, a CORBA server, and/or an HTTP Server.

The service API 130 may be any API. The service API 130 may provide access to data and/or functionality. The backend service 108 may be any component that implements the service API 130 exposed by the API management gateway 110. The backend service 108 may be any type of service that implements functionality accessible via the service API 130.

The external service 112 may be any service that is external to an organization, and that is managed by a third party. The external service 112 may expose and/or implement an API such as an external API 132. Examples of the external service 112 may include a payment service, a mapping service, an authentication service, or any other type of service.

Any API, such as the service API 130 or the external API 132, may be in the form of a specification of one or more programmatic procedures exposed to consumers or users of the API 130 or 132. Each of the programmatic procedures has a name. Any programmatic procedure may have zero, one, or more parameters. The programmatic procedure may return a data result in some examples. In other examples, the programmatic procedure may not return a data result. The programmatic procedure may return a status code result as part of an Internet protocol in some example, where the status code indicates that the API request 120 was received and indicates whether or not the API request 120 was processed correctly. A web API may be a programmatic interface to a request-response message system in which a request may be expressed in a text format, such as JSON (JavaScript Object Notation) or XML (eXtensible Markup Language), and which the programmatic interface is exposed via a network such as the Internet. The web API may be accessible via SOAP (Simple Object Access Protocol) and REST (Representational State Transfer). In some examples, an API may be in the form of a library that includes specifications for routines, data structures, object classes, and/or variables.

The API analytics module 102 may be a component that analyzes API usage in the API ecosystem 106. The API analytics module 102 may include an API monitor 134, a pattern recognition module 136, a pattern classification module 138, and a usage identification module 140.

The API monitor 134 may be any component that monitors API usage in the API ecosystem 106 and collects API call data 146. The API call data 146 may, inter alia, identify programmatic procedures, parameters passed to programmatic procedures, and an order in which the programmatic procedures were called. In some examples, the API call data 146 may identify a series of programmatic procedures in the API that were invoked at an interface over time. For example, the API call data 146 may identify API Name 1, API Name 2, and API Name 3 indicating that API Name 1 was invoked at the interface first, then API Name 2 was invoked at the interface, and finally API Name 3 was invoked at the interface.

The pattern recognition module 136 may be a component that identifies API usage patterns 142 in the API call data 145 monitored by the API monitor 134 during an initialization phase. The API usage patterns 142 may identify a structure of API calls that generalizes a behavior of a series of API calls that are performed as a result of users or scripts completing a use case and/or a set of functionalities. For example, the API usage patterns 142 may include a pattern of API calls that are invoked when a user searches or browses through products on an online store. The pattern of API calls may specify a call structure, for example, in which a first programmatic procedure may be called any number of times followed by a second programmatic procedure. In other words, if two monitored API calls sets in the API call data 145 only vary based on a number of times the first programmatic procedure was called, then the two monitored API call sets may map to the same API usage pattern 142. The API usage patterns 142 may also be referred to as API workflow patterns. The API usage patterns 142 may include frequent API usage patterns detected using a frequent subgraph mining algorithm.

The pattern classification module 138 may be a component that generates a classification structure 144, such as a classification decision tree, based on the API usage patterns 142 generated by the pattern recognition module 136. The classification structure 144 may be any data structure, such as a classification decision tree, from which a classification may be determined. As described in detail below, the decision tree may be pre-populated by performing predetermined use cases for the pattern recognition module 136 to generate the API usage patterns 142 from the API call data 145, where the API usage patterns 142 are fed to the pattern classification module 138 during the initialization phase. Accordingly, the pattern classification module 138 may be a component that generates the classification structure 144 based on the API call data 145.

The usage identification module 140 may be a component that analyzes the API call data 146 gathered by the API monitor 134 during an activity identification phase. As described in detail below, the usage identification module 140 may truncate the API call data 146 to determine a structure of API calls that are identified in the API call data 146, and determine a type of activity that resulted in the API call data 146 based on the classification structure 144 generated by the pattern classification module 138. Alternatively or in addition, the usage identification module 140 may determine a similarity between the API call data 146 gathered during the activity identification phase and the API usage patterns 142 determined during the initialization phase.

The applications 114 may be in communication with the API management gateway 110, the backend service 108, and/or the external service 112 over a network 148. The API analytics module 102 may also be in communication with the API management gateway 110, the backend service 108, and/or the external service 112 over the network 148. The network 148 may include a local area network (LAN), a wireless local area network (WLAN), a WI-FI® (a registered trademark of Wireless Ethernet Compatibility Alliance, Inc. of Austin, Tex.) network, a personal area network (PAN), a wide area network (WAN), the Internet, an Internet Protocol (IP) network, any other communications network, or any combination thereof.

Alternatively or in addition, the applications 114 and/or the API analytics module 102 may be in communication with the API management gateway 110, the backend service 108, and/or the external service 112 via an inter-process protocol, such as named pipes. Alternatively or in addition, one or more of the applications 114 may execute in a same process as the API management gateway 110 and/or the backend service 108.

Figure 2:
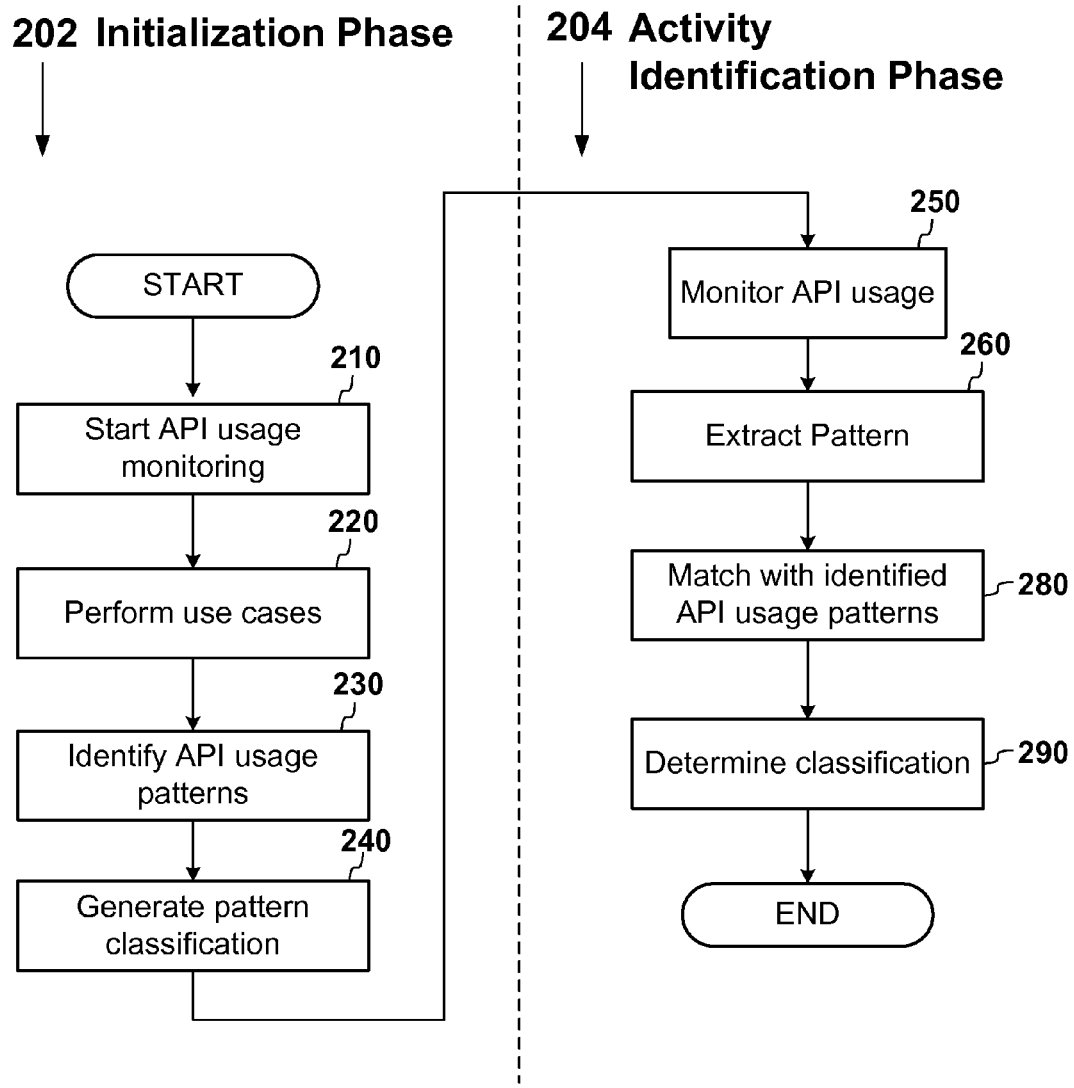
FIG. 2 illustrates a flow diagram of example logic of an API analytics system.

During operation of the system 100, the API usage in the API ecosystem 106 may be monitored and analyzed. For example, operations such as those illustrated in FIG. 2 may be performed. The operations may be executed in a different order than illustrated in FIG. 2. The operations performed may include additional, different, or fewer operations.

Operations may be performed during an initialization phase 202 and during an activity identification phase 204. The initialization phase 202 may be a timeframe in which the API usage patterns 142 and/or the classification structure 144 are generated from the API call data 146 while the activities of the applications 144 are controlled and/or known. In contrast, the activity identification phase 204 may be a timeframe in which an activity of one or more of the applications 114 may be uncontrolled or initially unknown. During the activity identification phase 204, the type of activity or activities being performed by the application or applications 114 may be determined based on the API usage patterns 142 and/or the classification structure 144. The phases 202 and 204 may be repeated any number of times. In some examples, operation of the system 100 may take place during phases other than the initialization phase 202 and the activity identification phase 204.

During the initialization phase 202, the API usage in the API ecosystem 106 may be monitored (210) while the activities of the applications 144 are controlled and/or known. The applications 114 may have been instrumented to transmit information regarding API usage to the API monitor 134. For example, application developers may have been provided with a software development kit (SDK) when the applications 144 were developed. Components of the SDK built into the applications 114 may transmit statistics, such as delay, errors, logs, API request context, or any other information related to API calls to the API monitor 134 during the initialization phase 202 and/or the activity identification phase 204. The API calls may be to the service API 130, the external API 132, and/or any other API.

The API management gateway 110 may have direct access to the API requests 120 received from the applications 114 and to responses received from the backend service 108. Accordingly, the API management gateway 110 may provide information regarding usage of the service API 130 to the API monitor 134. In particular, the API management gateway 110 may transmit the service API usage information to the API monitor 134. Alternatively or in addition, the API management gateway 110 may log the service API usage information, and another component may read the log and transmit the information to the API monitor 134. Alternatively, the API monitor 134 may read the log directly. In some examples, the API management gateway 110 may provide an API usage service through which the API monitor 134 may obtain information regarding usage of the service API 130. One example of such a service is APIGEE®, a registered trademark of Apigee Corporation of Palo Alto, Calif.

The backend service 108, which may implement the service API 130, may directly impact API performance. A monitoring tool 148, such as system monitoring tool, may provide information related to the performance of the backend service 108 to the API monitor 134. The information related to the performance of the backend service 108 may be related to the performance of the service API 130. The performance of the service API 130 may depend on network latency (such as latency between the application 114 and the API management gateway 110 or between the API management gateway 110 and the backend service 108), performance of the API management gateway 114 as well as performance of the backend services 108. If there is a delay in an API response, it may be desirable to pinpoint to a performance bottleneck. By monitoring the backend service 108 with the monitoring tool 148, a bottleneck caused by the backend service 108 may be identified and eliminated in some cases. In particular, resource usage (such as CPU usage, memory usage, storage usage, and I/O bandwidth usage) of a server running the backend service 108 may be continuously monitored by the monitoring tool 148. If the CPU usage of the server is over a threshold value, such as 95%, then the server may be overloaded and may, therefore, impact performance of the service API 130. Such resource usage information may be obtained using system monitoring tools such as iostat. Therefore, with the backend service performance monitoring, a determination may be made whether a performance issue of the service API 130 is caused by the backend service 108. Accordingly, appropriate action may be taken to remedy the performance issue. For example, backend resources may be scaled up.

The external service 112 may transmit information regarding usage of the external API 132 to the API monitor 134. Arrangements may be made with a provider of the external service 112 to provide such information. Alternatively or in addition, the information regarding the usage of the external API 132 may be gathered by the API monitor 134 from a directory service of online APIs, such as PROGRAMMABLEWEB®, a registered trademark of John Musser of Seattle, Wash., or MASHAPE®, a registered trademark of Mashape, Inc. of San Francisco, Calif. Alternatively or in addition, an API platform that acts as an intermediary between the applications 114 and the services 112 and 108 may provide the information regarding the applications' 114 usage of the external API 132 to the API monitor 134. APIGEE® provides one such API platform. The applications 114 may be developed with an SDK provided by APIGEE® that wraps calls to the external service 112. A mobile analytics features available in the APIGEE® platform may provide the information regarding the applications' 114 usage of the external API 132 to the API monitor 134.

As described above, the API monitor 134 may collect the API usage information from the ecosystem 106. The API monitor 134 may extract the API call data 146 from the API usage information if necessary and store the API call data 146 in the memory 104. In some examples, the API monitor 134 may include an end-to-end API correlation module 150 that correlates API calls to each other. For example, the end-to-end API correlation module 150 may correlate the API calls originating from the same conversation between one of the applications 114 and the backend service 108. Alternatively or in addition, the end-to-end API correlation module 150 may correlate the API calls made within a transaction, and/or the API calls made within a request-response message. Each of the API requests 120 may include a context 152, such as an API key, a session identifier, a user identifier, a transaction identifier and/or any other object that provides context for the API request or otherwise identifies the API request. The end-to-end API correlation module 150 may correlate two or more of the API requests 120 based on the context 152 being shared by the API requests 120. In one example, the identifier may be assigned by one of the components in the API ecosystem 106, such as the application 114, the API management gateway 110, or the backend service 108, and then propagated by other components in the API call chain.

The API usage information transmitted to the API monitor 134 may be transmitted at a selected frequency. The frequency may be selected so that gathering the API usage information is light-weight and does not impart significant overhead on the performance of the applications 114, the API management gateway 110 or any other component of the API ecosystem 106. A determination of what metrics to collect in the API usage information and/or the API call data 146 may also be determined. The frequency at which the API usage information is collected may determine how much overhead is imposed on the API analytics system 100. If sampled at a high frequency, a substantial amount of data for analytics may be collected. However, sampling at the high frequency may cause non-negligible overhead. On the other hand, collecting data at a low frequency may lead to inaccurate analysis due to lack of data. For example, a change in the monitoring data may be missed that could be an important indicator for API performance. The sampling frequency may be determined through experiments and may be a parameter which can be adjusted. In the experiments, various values of the sampling frequency may be selected. For each selected frequency, the time to collect all the monitoring data, as well as the change in the data between rounds, may be recorded. API related data, such as the response time, transition time, may be recorded for every API call. Backend service resource usage data may be collected every 5 seconds, or some other interval. In some examples, all of the monitoring metrics that are available may be collected.

While the API monitor 134 collects the API usage information from the ecosystem 106, predetermined use cases may be performed (220). For example, the application 114 may be scripted or manually controlled to perform one or more use cases. Each use case may include any activity relevant to the application 114. Examples use cases may include browsing an product catalogue, submitting a purchase order, scanning a data service with a script, and generating an online report.

Each of the use cases 320 may be associated with the context 152, such as the user identifier and the transaction identifier, and a message identifier that identifies a corresponding sequence of API calls in the API call data 146. The inclusion of the context 152 and/or other identifier in the API requests 120 provides a mechanism by which the API analytics system 100 may associate the use cases 320 to activities that resulted in the sets of API calls 310. Given that performance of multiple use cases (from various applications and users) may result in the API requests 120 passing through the API management gateway 110, the context 152 may identify, at the API management gateway 110, the API calls that occur as part of a specific use case, such as the API calls made from a particular user, from a particular application, and/or within a particular transaction. Such identifiers may be appended as part of a design of the API calls. For example, an identifier received from the backend service 108 may be included in the context 152 that is carried through all API calls that are associated with a particular transaction. Alternatively or in addition, a user identifier may be included in the context 152 for the API requests 120 made on behalf of a user identified by the user identifier. Alternatively or in addition, an identifier may be collected from the API management gateway 110, such as an API key that is used to authenticate the API requests 120 and which may identify the applications 114 and/or app developers. Alternatively or in addition, when one of the API requests 120 is submitted to the API management gateway 110, the API request may be assigned a unique identifier. Similarly, the application, which made the API request, as well as the user who is using the application may be assigned corresponding unique identifiers. Therefore, the API requested may be identified using the key, the application identifier, and/or the user identifier.

Figure 3:
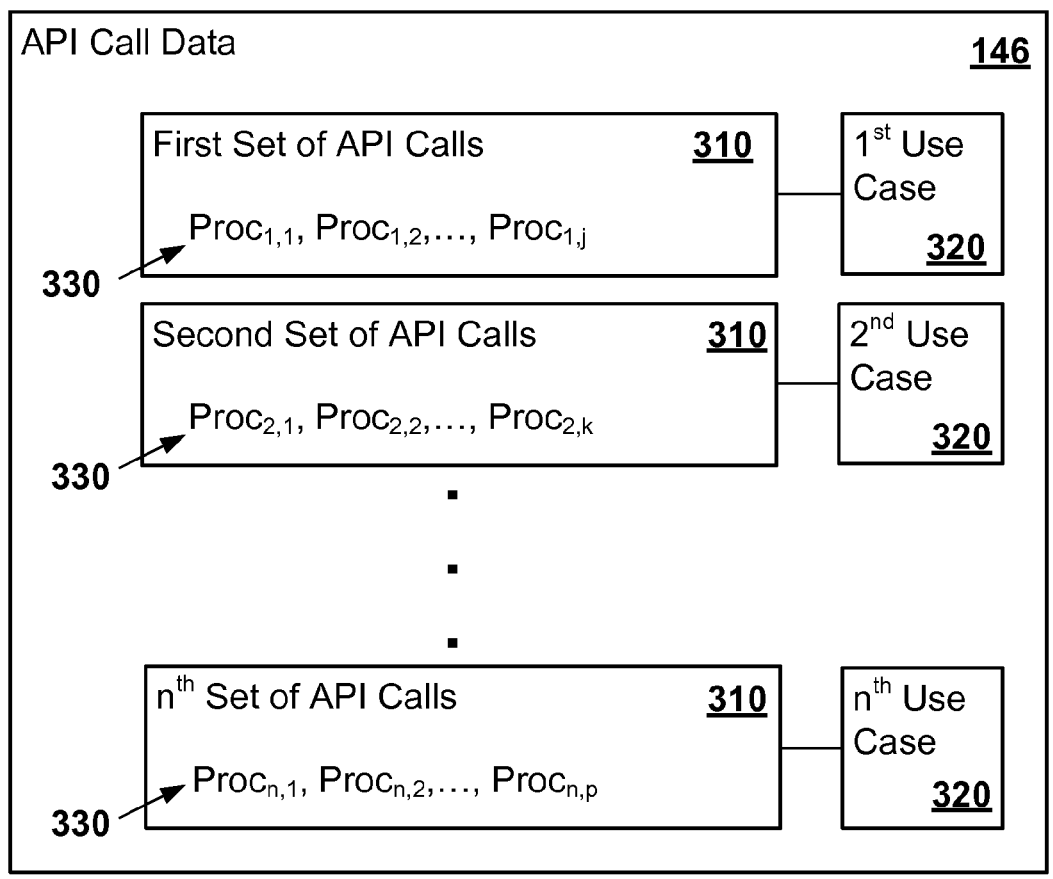
FIG. 3 illustrates an example of API call data.

After the use cases are performed and the API usage is monitored, then the API call data 146 may identify multiple sets 310 of API calls that were detected during performance of the use cases. FIG. 3 illustrates an example of the API call data 146. Each respective one of the sets 310 of API calls may be formed by grouping API calls that resulted from the API requests 120 according to the context 152 of the API requests 120 or according to another identifier associated with a use case. Accordingly, each one of the sets 310 of API calls may have resulted from performance of a respective use case 320 and be associated with the respective use case 320 in the memory 104. In some cases, more than one of the multiple sets 310 of the API calls may be associated in the memory 104 with a single one of the use cases 320. Each one of the sets 310 of API calls may identify a series of API calls 330 that were invoked in the order that the API calls are listed in the series. Accordingly, for each respective one of the sets of API calls 310, the context 152 of the API requests 120 that invoked each of the API calls 330 identified in the series of API calls may be common to the API calls 330 in the respective one of the sets of API calls 310.

Referring back to FIG. 2, the API usage patterns 142 may be identified (230) from the API call data 146. In particular, the API usage patterns 142 may be patterns frequently found in and/or across the sets 310 of API calls. Patterns may be considered frequent if the patterns occur above a threshold number, such as above a percentage or ratio. For example, a number p may represent the threshold number as a percentage. If the threshold number p is 0.5, for example, then a pattern should appear in at least 50 percent of the sets of API calls 310 in order to be considered frequent. The threshold number p may be a tunable parameter.

To identify the API usage patterns 142, the pattern recognition module 136 may reduce or consolidate sequentially repeated API calls in each of the sets of API calls 310 to form truncated API call data. In the truncated API call data, comparisons of the sets of API calls 310 may result in a match if the only difference between the sets 310 is in how many times one or more of the API calls is sequentially called. By way of example, consider the series of API calls 330 "A, B, B, B, C," in which programmatic procedure A is called, then programmatic procedure B is repeatedly called three times, and, finally, programmatic procedure C is called. The series of API calls 330 "A, B, B, B, C," may match the series of API calls 330 "A, B, B, B, B, B, B, B, B, B, B, B, B, C" in the truncated API call data because the only difference between the sets 310 is in how many times programmatic procedure B is sequentially called. A repetition threshold, r, may indicate the number of times that the API call must be repeated before it is reduced. In one example where the repetition threshold, r, equals three, the series of API calls 330 "A,B,B,C" will not be truncated, and will be considered different from the series of API calls 330 "A,B,B,B,C". Generating the truncated API call data may result in performance improvements when finding the API usage patterns 142.

The API usage patterns 142 that are frequent may be identified (230) from the API call data 146 by the pattern recognition module 136 using a Deterministic Finite Automation (DFA) graph. In one example, each set of API calls 310 may first be represented as a string, $S_i$, where each element of the string identifies a corresponding API call in the series of API calls 330, such as the string "A, B, B, B, C" having elements "A", "B", "B", "B", and "C". Any delimiter, such as a comma or a space character, may separate each element of the string $S_i$.

Each string $S_i$ may be encoded by reducing sequentially repeated elements. For example, a sequence of k calls to "A", may be encoded as "A_k" if k is less than r (the repetition threshold), or "A_*" otherwise. Consider an example where the repetition threshold, r, is four. The string "A, A, A, A, A", for example, may be encoded as "A_*", and the string "A, A, A," may be encoded as "A_3". The resulting encoded stings may represent the truncated call data.

The pattern recognition module 136 may create a directed DFA graph to represent each encoded string, $S_i$. The DFA may be created such that a node in the DFA is created for each element of the encoded string, and a directed edge connects the nodes corresponding to elements adjacent to each other in the encoded string. The direction of the edge indicates an order of the corresponding elements in the encoded string. For example, the DFA for the string " . . . , API1_i, API2_j, . . . " may include, among others, a node API1_i and a node API2_j, which are connected by an edge directed from API1_i to API2_j. As another example, the DFA for the string "API1, API 2_3, API3," may be "API1→API2_3→API3." The DFA need not be created for encoded string Si, if a DFA was already created for a matching encoded string, $S_k$. In other words, multiple encoded strings may share the same DFA.

Having created the directed graphs (DFAs) to represent the encoded strings, the pattern recognition module 136 may use a frequent subgraph mining algorithm to find the API usage patterns 142. The frequent subgraph mining algorithm may discover subgraphs that occur frequently over the sets of the DFAs that correspond to the sets of API calls 310. The pseudocode for one such algorithm, the "FSG" algorithm by Michihiro Kuramochi and George Karypis may include:

a. Iterate through all possible subgraphs with exactly one edge, finding all frequent graphs (>p) of size i, where i=1 in the first iteration. Add frequent graphs to a set of frequent subgraphs, S.
 b. Set i=2.
 c. While frequent subgraphs of size i−1 exist:
  i. For each frequent subgraph of size i−1, try each way to add one edge that is connected to the rest of the graph. If such connecting graph is frequent (>p), then add the connecting subgraph to the set of frequent subgraphs, S, for graphs of size i.
  ii. i=i+1.

The set of frequent subgraphs, S, may be expanded to remove the encoding. For example, the single node subgraph "A_2→" may be expanded to become the two node subgraph "A→A→". The subgraph "A_*→" may be expanded to become subgraph "A→A→A", when the repetition threshold is three, where node A has a self-loop, which is an edge that extends from a node back to the node.

The pattern recognition module 136 may determine whether each of the DFAs in the set of expanded frequent subgraphs is a subgraph of another subgraph in the set of expanded frequent subgraphs. If not, then the respective DFA in the set of expanded frequent subgraphs may be added to the API usage patterns 142. Otherwise, the respective DFA may not be added to the API usage patterns 142.

The pattern recognition module 136 may include additional information in the API usage patterns 142. FIGS. 4A and 4B illustrate two examples of the API usage patterns 142. FIG. 4A illustrates an example API usage pattern that results from a script that accesses a catalogue data service searching for products and details about the products. FIG. 4B illustrates an example API usage pattern that results from a person browsing a product catalogue service. In addition to identifying programmatic procedure names 410 in the API 130 or 132, the API usage patterns 142 may, for example, include procedure information 420 that identifies information regarding the programmatic procedures, such as an average execution time and a standard deviation in the execution time of each programmatic procedure. Alternatively or in addition, the API usage patterns 142 may include transition information 430 that identifies information regarding transitions between API calls, such as between a first programmatic procedure and a second programmatic procedure. Examples of the transition information 430 may include an average time between execution of the first and second programmatic procedures, a standard deviation of the average time between execution of the first and second programmatic procedures, and a probability or a likelihood that the transition from the first programmatic procedure to the second programmatic procedure will occur instead of a transition from the first programmatic procedure to any other programmatic procedure.

Referring back to FIG. 2, the classification structure 144 may be generated (240) from the API usage patterns 142. The classification structure 144 may be generated by providing the API usage patterns 142 to a machine learning algorithm implementation, such as WEKA®, a registered trademark of WaikatoLink Limited of Hamilton, New Zealand.

Figure 5:
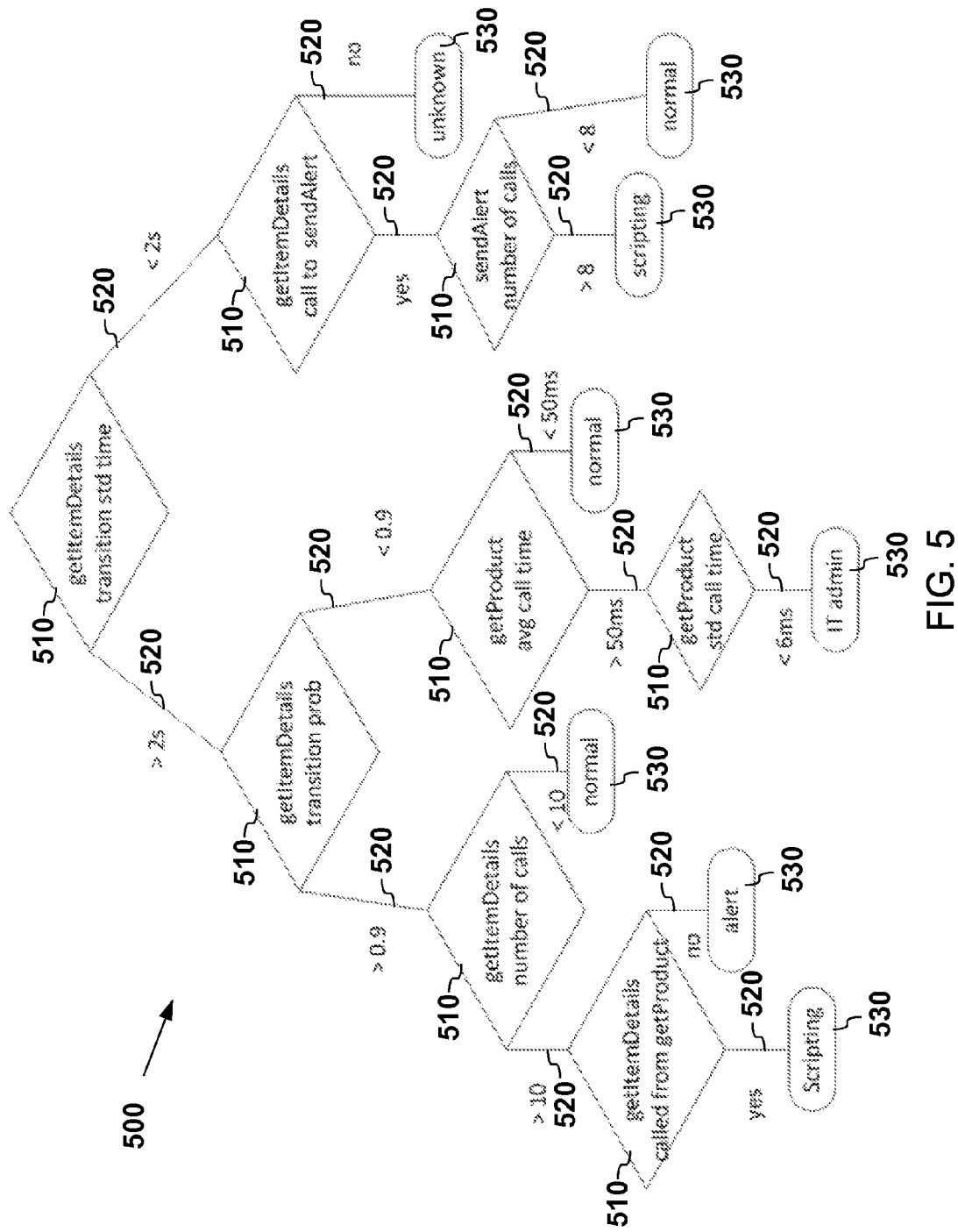
FIG. 5 illustrates an example of a decision tree.

The classification structure 144 may be a decision tree 500, such as the decision tree 500 illustrated in FIG. 5. The decision tree 500 may be a flow-chart like structure in which each internal node 510 may represent a test on an attribute of an element of one or more of the API usage patterns 142, each branch 520 may represent an outcome of a test, and each leaf node 530 may represent a decision indicating a type of activity. The type of activity may be considered a classification of the activity. Examples of the classifications or the type of activities may include "normal", "alert", "scripting", "IT admin", "unkown" or any other type of activity. In some examples, internal nodes 510 may represent events that may have occurred in the API ecosystem 106. Examples of such events may include an upgrade of an API to a determined version, or other change. Such events may be correlated to API performance, which may vary depending on whether what events may have occurred in the API ecosystem 106.

Referring again to FIG. 2, the API usage in the API ecosystem 106 may be monitored (250) during the activity identification phase 204. In contrast to the initialization phase 202, the activity of one or more of the applications 114 may be initially unknown during the activity identification phase 204. The API call data 146 during the activity identification phase 204 may represent call data that resulted when the unknown activity was performed.

An API usage pattern may be extracted (260) by usage identification module 140 from one or more of the sets of API calls 310 in the API call data 146 during the activity identification phase 204. Each one of the sets of API calls 310 in the API call data 146 may be the source of a corresponding extracted API usage pattern. As explained in more detail below, the API usage patterns extracted during the activity identification phase 204 may include truncated call data, but frequent API usage patterns in the API call data 146 need not be determined during the activity identification phase 204.

To generate the extracted API usage pattern during the activity identification phase 204, the usage identification module 140 may reduce sequentially repeated API calls in each of the sets of API calls 310 to form encoded or truncated API call data. In one example, each set of API calls 310 may be represented as a string, $S_i$, where each element of the string identifies a corresponding API call in the series of API calls 330, such as the string "A, B, B, B, C" having elements "A", "B", "B", "B", and "C". Any delimiter, such as a comma or a space character, may separate each element of the string $S_i$. Each string $S_i$ may be encoded by reducing sequentially repeated elements. Consider an example where the repetition threshold, r, is four. The string "A, A, A, A, A", for example, may be encoded as "A_*", and the string "A, A, A," may be encoded as "A_3". The resulting encoded stings may represent the truncated call data.

The usage identification module 140 may create a directed DFA graph to represent each encoded string, $S_i$, of the truncated API call data. The DFA may be created such that a node in the DFA is created for each element of the encoded string, and a directed edge connects the nodes corresponding to elements adjacent to each other in the encoded string. The direction of the edge indicates an order of the corresponding elements in the encoded string. For example, the DFA for the string " . . . , API1_i, API2_j, . . . " may include, among others, a node API1_i and a node API2_j, which are connected by an edge directed from API1_i to API2_j. As another example, the DFA for the string "API1, API 2_3, API3," may be "API1→API2_3→API3." The DFA need not be created for encoded string $S_i$, if a DFA was already created for a matching encoded string, $S_k$. In other words, multiple encoded strings may share the same DFA. For example, API call sequences "API1, API2, API2, API3" and "API1, API2, API2, API2, API2, API2, API3" may share the same DFA when the repetition threshold, r, is one or two.

The set of DFAs may be expanded to remove the encoding. For example, the single node subgraph "A_2→" may be expanded to become the two node subgraph "A→A→". The subgraph "A_*→" may be expanded to become subgraph "A→A→A", when the repetition threshold is three, where node A has a self-loop. The expanded set of DFAs may represent the truncated call data and the extracted API usage pattern.

In an alternative example, the truncated API call data may be generated without encoding and decoding strings in the API call data 146. Instead, the nodes of the DFAs may be created for each of the API calls in the series of API calls 330 unless a sequentially repeated API call is repeated more than the repetition threshold, r. The sequentially repeated API call that exceeds the repetition threshold may be represented in the DFA as one node with a self-loop edge. Each of the resulting DFAs may represent the truncated call data and the extracted API usage pattern for a corresponding one of the series of API calls 330 in the API call data 146.

The usage identification module 140 may identify any difference or similarity between the extracted API usage pattern and one or more of the predetermined API usage patterns 142. The one or more of the predetermined API usage patterns 142 may be selected for comparison with the extracted API usage pattern by matching (280) the extracted API usage pattern with the predetermined API usage patterns 142. In some examples, the usage identification module 140 may determine the type of activity or activities by matching (280) the extracted usage pattern with one of the predetermined API usage patterns 142.

In order to match (280) the extracted API usage pattern, the extracted API usage pattern may be compared with the predetermined API usage patterns 142. Any suitable matching algorithm may be used. For example, the Knuth-Morris-Pratt algorithm may be applied to find a subset in each of the API usage patterns 142 that is a match with the extracted API usage pattern and a corresponding score. For example, the extracted API usage pattern "A→A→A→B→C" may have a match with a predetermined API usage pattern "A→A→A→B→D→C" and have a score of $4/5=0.8$ because "A→A→A→B" is included within the predetermined API usage pattern. The predetermined API usage pattern having the highest score of the API usage patterns 142 may be considered the closest match to the extracted API usage pattern.

The predetermined API usage pattern having the highest score of the API usage patterns 142 may be associated with a corresponding one of the use cases 320. In some examples, the activity type of the corresponding use case may be inferred to be the type of activity that resulted in the extracted API usage pattern.

The usage identification module 140 may identify any difference and/or similarity between the extracted API usage pattern and the API usage patterns 142 that match the extracted API usage pattern. The differences and/or similarities may be communicated to an end-user through a graphical user interface.

Figure 6:
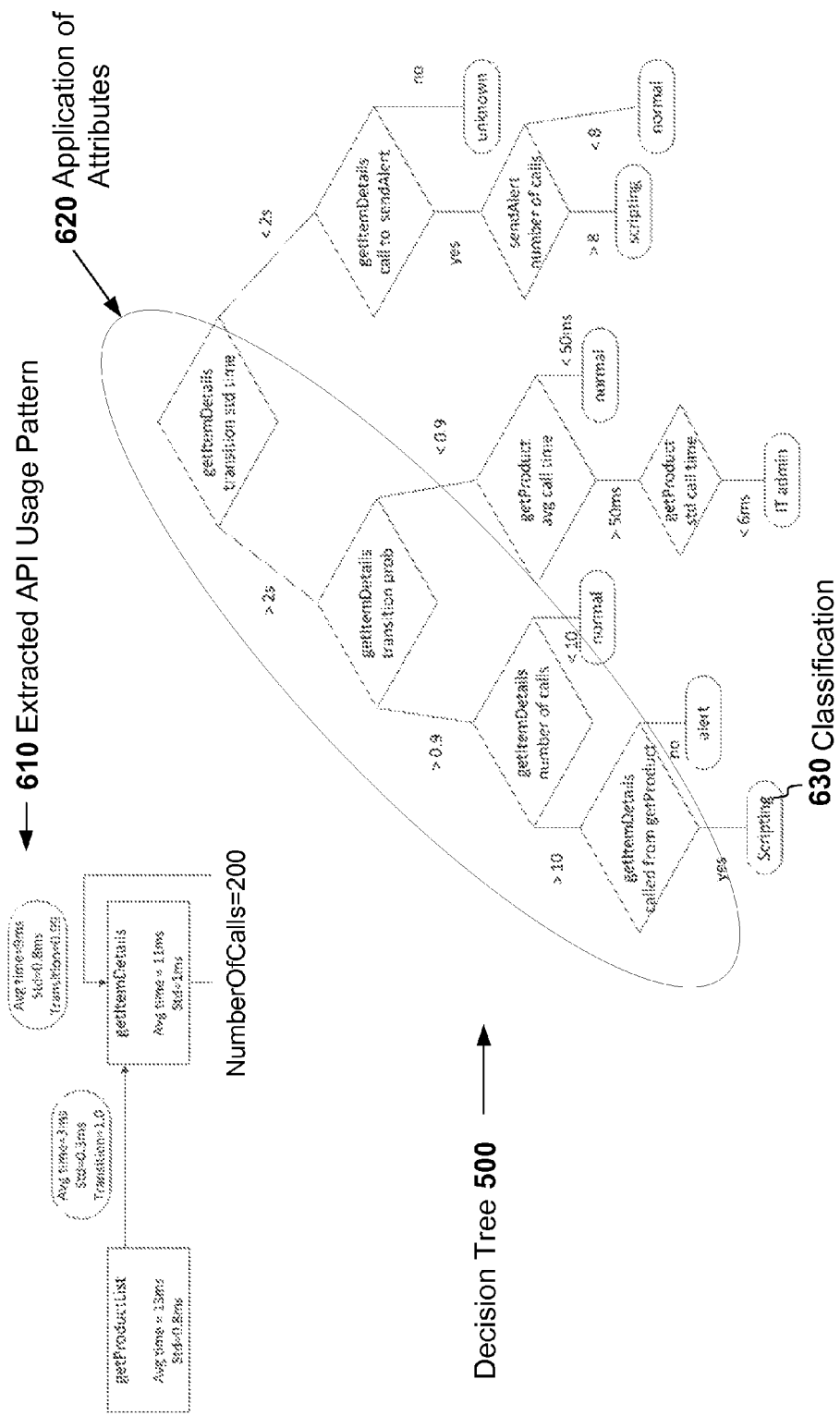
FIG. 6 illustrates an application of attributes of an extracted API usage pattern to a decision tree.

The type of activity that resulted in the extracted API usage pattern may be determined by classifying (290) the extracted usage pattern with the classification structure 144. For example, the decision tree 500 may predict a label for the extracted usage pattern by applying procedure information 420 and transition information 430 in the extracted usage pattern to the tests indicated by the internal nodes 510 of the decision tree 500. FIG. 6 illustrates an application 620 of attributes of an extracted API usage pattern 610 to the decision tree 500 to obtain a classification 630 of the extracted API usage pattern 610. One of the attributes of the extracted API usage pattern 610 illustrated in FIG. 6 is that a programmatic procedure "getItemDetails" was sequentially called 200 times in a row. The decision tree 500 indicates that the extracted API usage pattern 610 is a result of machine scripting.

Through the determination of the type of activity, the API analytics system 100 may identify behaviors that are deemed harmful. For example, the system 100 may distinguish between real people browsing a product catalogue and a script crawling a data service for product pricing information by identifying timing between API calls. The system 100 may distinguish between a person checking product availability and a script checking the product availability by determining whether a product availability check is constantly performed or randomly performed. The system 100 may identify data exposure by detecting that a substantial or threshold number of applications are accessing a particular set of data. By raising an alert to a person, such as an API product manager or IT administrator, a determination may be made as to whether the data exposure is a result of denial of service attack or whether the particular set of data is merely popular, and thus can be monetized.

Through the determination of the type of activity, the API analytics system 100 may detect supersets. In one example, an API provider, such as an online retailer may introduce an API. The API provider may wish to know how application developers respond to the newly introduced API. For example, the new API, called sendPromotion, may be an API that, when executed, checks whether the contents of a shopping cart qualifies for a promotion before order submission, where order submission is accomplished through another API called submitOrder. The API analytics system 100 may aid in determining whether developers adopt the new API, and if so, a rate at which developers adopt the new API. The API analytics system 100 may monitor how many of the sets of API calls 310 include a call to sendPromotion before submitOrder. Each of the sets of API calls 310 may correspond to a use case. Prior to introducing the sendPromotion API, all of the set of API calls 310 include a call to submitOrder without a call to sendPromotion. However, after the sendPromotion API is added, a percentage of the sets of API calls 310 may include an invocation of sendPromotions before submitOrder. Such groupings of the sets of API calls 310 or use cases may be referred to as supersets.

Furthermore, the API analytics system 100 may identify which applications 114 and/or which user identifiers are associated with the corresponding supersets in order to better understand why some use cases may or may not use the new API. For example, the API analytics system 100 may determine whether the use of the new API is related to particular users and/or to particular applications that the users use. For example, are mobile applications more likely to use the new API or are web applications? Alternatively or in addition, the API analytics system 100 may determine whether the use of the new API is related to items that the users are purchasing. Furthermore, the API analytics system 100 may identify any error experienced when the new API is called. A particular use case API pattern may indicate that an application developer first adopted the new API and then subsequently stop using the new API.

Through the determination of the type of activity, the API analytics system 100 may detect abnormal activities. In one example, the service API 130 may include a validateAddress procedure, a processCreditCard procedure, and a selectShipping procedure. The validateAddress procedure should be called before the processCreditCard and/or selectShipping procedure. If the order of the procedures was improper or one of a set of mandatory programmatic procedures is missing during the activity identification phase 204, then the system 100 may highlight the difference in the set of API calls when the closest match with the extracted API usage pattern 610 has the proper order. If the classification structure 144 identifies an improper use of the service API 130 as a common mistake, then the improper use of the service API 130 may be a result of widespread developer confusion rather than a one-off mistake.

Behaviors that are bad and/or abnormal may be identified by the system 100. The system 100 may produce an alert. For example, a visual indication may be displayed in a graphical user interface, a message may be sent over the network 148, an event may be logged in an event log, or any other suitable alert may be produced.

Figure 7:
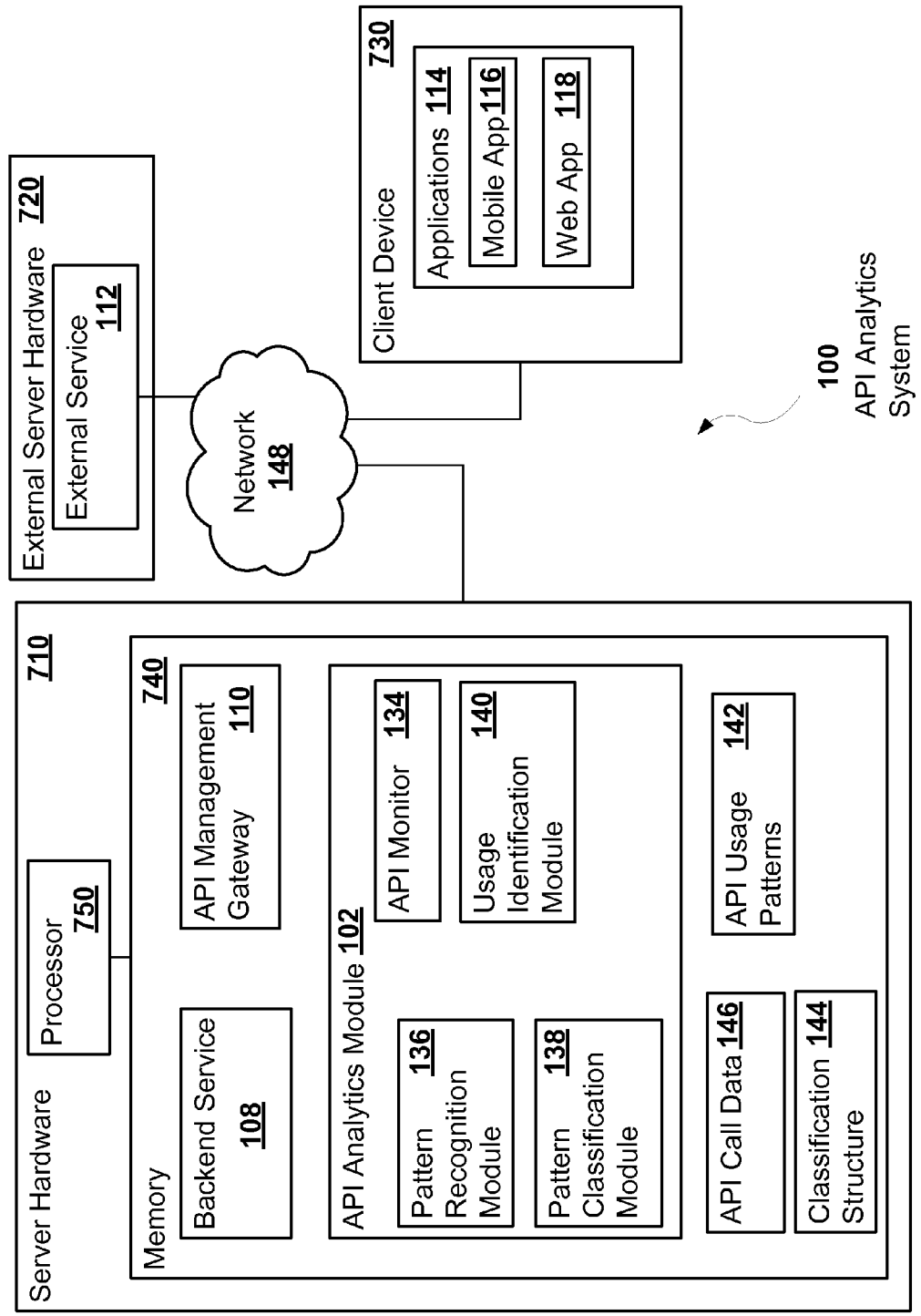
FIG. 7 illustrates an example of an API analytics system having a different grouping of components than illustrated in FIG. 1.

The system 100 may be implemented with additional, different, or fewer components. For example, the system may include just the API analytics module 102. In another example, the system 100 may not include web applications 118 and/or the external service 112. FIG. 7 illustrates yet another example of the system 100 that includes server hardware 710, external server hardware 702, and one or more client devices 730. The server hardware 710 and the external server hardware 702 may include any type of processing device such as a rack mounted server, a desktop machine, or a laptop. The client device and/or devices 730 may include any mobile device or desktop computer.

The server hardware 710 may include a memory 740 and a processor 750. The processor 750 may be in communication with the memory 740. In one example, the processor 750 may also be in communication with additional elements, such as a display and a network interface. The processor 750 may be a general processor, a central processing unit, a microcontroller, an application specific integrated circuit (ASIC), a digital signal processor, a field programmable gate array (FPGA), a digital circuit, an analog circuit, or any combination of processors.

The processor 750 may be one or more devices operable to execute logic. The logic may include computer executable instructions or computer code embodied in the memory 740 or in other memory that when executed by the processor 750, cause the processor to perform the features of the components. The computer code may include instructions executable with the processor 750. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

The memory 704 may include modules, such as the backend service 108, the API management gateway 110, and the API analytics module 102. The memory 704 may include data such as the API call data 146, the classification structure 144, and the API usage patterns 142.

The external server hardware 720 may include the external service 112. The client device 730 may include one or more of the applications 114.

Each component may include additional, different, or fewer components. For example, the API analytics module 102 may include the pattern recognition module 136, the pattern classification module 138, the API monitor 134, and the usage identification module 140. In a different example, the API analytics module 102 may include just the usage identification module 140 or the pattern recognition module 136. In another example, the memory 704 in the server hardware may not include the backend service 108 or the API management gateway 110.

The system 100 may be implemented in many different ways. Each module, such as the pattern recognition module 136, the pattern classification module 138, the API monitor 134, and the usage identification module 140, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 740, for example, that comprises instructions executable with the processor 750 or other processor to implement one or more of the features of the module. When any one of the modules includes the portion of the memory that comprises instructions executable with the processor, the module may or may not include the processor. In some examples, each module may just be the portion of the memory 740 or other physical memory that comprises instructions executable with the processor 750 or other processor to implement the features of the corresponding module without the module including any other hardware. Because each module includes at least some hardware even when the included hardware comprises software, each module may be interchangeably referred to as a hardware module, such as the pattern recognition hardware module, the pattern classification hardware module, and the usage identification hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture consistent with the innovation may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. An application programming interface (API) analytics system comprising:
   a memory comprising
      API call data that identifies a set of API calls detected during performance of an activity, and
      a classification structure that maps predetermined API usage patterns to predetermined types of activities, the classification structure comprising a plurality of nodes connected by a plurality of branches, the nodes representing tests, the branches representing outcomes of the tests, leaf nodes of the nodes representing the predetermined types of activities; and
   a processor configured to:
      form truncated API call data in which duplicated API calls in the set of API calls are consolidated in the truncated API call data; and
      classify the activity as one of the predetermined types of activities based on a traversal of at least one of the branches of the classification structure to a leaf node that represents the one of the predetermined types of activities, the traversal governed by an application of a set of the tests to the truncated API call data, the set of the tests including any of the tests represented by any of the nodes on a path that includes the at least one of the branches of the classification structure and that ends at the leaf node.

2. The system of claim 1, wherein each API call in the set of API calls is a respective programmatic procedure.

3. The system of claim 1, wherein the processor is configured to identify any differences between the truncated API call data and a predetermined API usage pattern that matches the truncated API call data.

4. The system of claim 1 wherein the tests include a test related to an execution time of a programmatic procedure identified in the truncated API call data.

5. The system of claim 1 wherein an API call repeated n times in the API call data is represented as a transition from the API call to the API call in the truncated API call data when n is greater than a repetition threshold.

6. The system of claim 1 wherein the tests include a test related to an amount of time elapsed between execution of two programmatic procedures identified in the truncated API call data.

7. The system of claim 1 further comprising an API monitor that monitors an API ecosystem and collects the API call data.

8. A non-transitory computer readable storage medium comprising computer executable instructions, the computer executable instructions executable by a processor, the computer executable instructions comprising:
   instructions executable to detect a set of API calls invoked during performance of an activity, the set of API calls identified in API call data;
   instructions executable to provide a classification structure that maps predetermined API usage patterns to predetermined types of activities, the classification structure comprising a plurality of nodes connected by a plurality of branches, the nodes representing tests, the branches representing outcomes of the tests, leaf nodes of the nodes representing the predetermined types of activities;
   instructions executable to generate truncated API call data through consolidation of API calls that are duplicated in the set of API calls; and
   instructions executable to determine that the activity is one of the predetermined types of activities as a result of a traversal of a path that includes a test node, a branch and a leaf node of the classification structure, the leaf node representing the one of the predetermined types of activities, wherein the traversal is in accordance with application of a test associated with the test node, and proceeding down the path along the branch, which corresponds to a result of the test.

9. The computer readable storage medium of claim 8 further comprising instructions executable to convert the truncated API call data to directed graphs.

10. The computer readable storage medium of claim 9 further comprising instructions executable to identify API usage patterns that occur above a threshold frequency in the truncated API call data with a frequent subgraph mining algorithm applied to the directed graphs, wherein.

11. The computer readable storage medium of claim 8, wherein each API call in the set of API calls is for a corresponding programmatic procedure that was invoked over a network in response to a corresponding API request.

12. The computer readable storage medium of claim 8 further comprising instructions executable to monitor an API ecosystem and collect the API call data in memory.

13. The computer readable storage medium of claim 8 further comprising instructions executable to group the API call data into sets of API calls based on a context included in API requests that invoked the API calls in each one of the sets of API calls.

14. The computer readable storage medium of claim 8 further comprising instructions executable to group the API call data into sets of API calls based on a context identified by an API management gateway.

15. A method to determine an activity type, the method comprising:
   detecting a set of API calls invoked during performance of an activity;
   identifying the set of API calls in API call data;
   providing a classification structure that maps predetermined API usage patterns to predetermined types of activities, the classification structure comprising a plurality of nodes connected by a plurality of branches, the nodes representing tests, the branches representing outcomes of the tests, leaf nodes of the nodes representing the predetermined types of activities;
   forming truncated API call data by consolidating duplicated API calls in the set of API calls into the truncated API call data; and determining that the activity is one of the predetermined types of activities as a result of traversing at least one of the branches of the classification structure to a leaf node that represents the one of the predetermined types of activities, wherein the traversing comprises applying a test to the truncated API data, the test associated with a node on a path that includes the at least one of the branches of the classification structure and ends at the leaf node, and proceeding down the path along a branch corresponding to a result of the test.

16. The method of claim 15, further comprising determining a difference between the API usage pattern and an extracted API usage pattern that is extracted from the set of API calls invoked during the activity.

17. The method of claim 15, wherein the classification structure comprises a classification decision tree, and wherein the determining that the activity is one of the predetermined types of activities comprises applying attributes of the set of API calls, which is represented by truncated API call data, to the classification decision tree.

18. The method of claim 15 further comprising generating the API call data by monitoring an API ecosystem.

19. The method of claim 18, wherein the API ecosystem is monitored and the type of activity that resulted in the set of API calls is determined in real-time.

20. The method of claim 15 further comprising producing an alert in response to a determination that the activity is the one of the predetermined types of activities.

* * * * *